United States Patent
Kung

(10) Patent No.: US 8,378,634 B2
(45) Date of Patent: Feb. 19, 2013

(54) POWER MANAGEMENT CIRCUIT

(75) Inventor: Nien-Hui Kung, Hsinchu (TW)

(73) Assignee: Richtek Technology Corporation, Hsin-Chu (TW)

( * ) Notice: Subject to any disclaimer, the term of this patent is extended or adjusted under 35 U.S.C. 154(b) by 259 days.

(21) Appl. No.: 13/033,950

(22) Filed: Feb. 24, 2011

(65) Prior Publication Data

US 2012/0217936 A1    Aug. 30, 2012

(51) Int. Cl.
*H02J 7/00*     (2006.01)
*H02J 7/04*     (2006.01)
*H02J 7/16*     (2006.01)

(52) U.S. Cl. ........ 320/132; 320/128; 320/134; 320/136; 320/152; 320/157

(58) Field of Classification Search .................... 320/132
See application file for complete search history.

(56) References Cited

U.S. PATENT DOCUMENTS 6,777,913 B2 *   8/2004   You ............................. 320/125
8,125,189 B2 *   2/2012   Formenti ...................... 320/134

* cited by examiner

*Primary Examiner* — Edward Tso
*Assistant Examiner* — Ahmed Omar
(74) *Attorney, Agent, or Firm* — Tung & Associates

(57) ABSTRACT

The present invention discloses a power management circuit, including: a first voltage regulator, which converts an input voltage to an output voltage; a second voltage regulator coupled between the output voltage and a battery; and a voltage difference control circuit, which receives the output voltage and a voltage of the battery, and outputs a voltage difference control signal to control the first voltage regulator. The voltage difference control circuit includes: a battery reference voltage determination circuit, which generates a battery reference voltage related to the battery voltage, and an error amplifier, which receives the output voltage and the battery reference voltage and generates the voltage difference control signal.

8 Claims, 5 Drawing Sheets

POWER MANAGEMENT CIRCUIT

BACKGROUND OF THE INVENTION

1. Field of Invention

The present invention relates to a power management circuit and a power management method, in particular to one that is capable of charging a battery while providing power to a load circuit.

2. Description of Related Art

FIG. 1 shows a schematic circuit diagram of a prior art power management circuit. As shown in FIG. 1, a switching regulator 11 receives a feedback signal related to an output voltage Vout, and converts an input voltage Vin to the output voltage Vout. The output voltage Vout is supplied to a load circuit 12, and the output voltage Vout also charges a battery 14 through a linear regulator 13. The switching regulator 11 may be, for example, a synchronous or asynchronous buck converter as shown in FIGS. 2A-2B, or a synchronous or asynchronous boost converter as shown in FIGS. 2CA-2D. The linear regulator 13 may be, for example, a circuit shown in FIG. 2E. In order to keep the output voltage Vout above a minimum voltage Vmin to meet the requirement of the load circuit 12, an output voltage detection circuit 15 is required which receives the output voltage Vout and generates a feedback signal which is sent to the switching regulator 11. The switching regulator 11 switches a power switch to convert the input voltage Vin to the output voltage Vout according to the feedback signal, while keeping the output voltage Vout above the minimum output voltage Vmin.

In this prior art, when the output voltage Vout charges the battery 14 through the linear regulator 13, if the voltage difference between the output voltage Vout and the battery voltage Vbat is too large, it may consume too much power and there would also be a heat dissipation problem. To overcome this problem, U.S. Pat. No. 7,710,079 discloses a power management circuit which controls the voltage difference between the output voltage Vout and the battery voltage Vbat. However, in the circuit proposed in U.S. Pat. No. 7,710,079, an error amplifier with three inputs is required, which compares the output voltage Vout, the battery voltage Vbat and a constant reference voltage, for controlling the voltage difference between the output voltage Vout and the battery voltage Vbat and providing a proper output voltage Vout to the load circuit 12.

To deal with the same problem of power consumption and heat dissipation, and to enhance the efficiency of power management, the present invention proposes a different approach which only requires a general error amplifier with two inputs to achieve the same function.

SUMMARY OF THE INVENTION

The objective of the present invention is to provide a power management circuit.

To achieve the foregoing purpose, the present invention provides a power management circuit, comprising: a first voltage regulator converting an input voltage to an output voltage; a second voltage regulator coupled between the output voltage and a battery; and a voltage difference control circuit receiving the output voltage and a voltage (Vbat) of the battery, and outputting a voltage difference control signal to control the first voltage regulator so that when the battery voltage (Vbat) does not exceed a minimum output voltage, the output voltage is higher than the minimum output voltage, and when the battery voltage (Vbat) exceeds the minimum output voltage, the output voltage is higher than the battery voltage (Vbat) by a voltage difference; wherein the voltage difference control circuit includes: a battery reference voltage determination circuit generating a battery reference voltage (Vbr) related to the battery voltage (Vbat); and an error amplifier receiving the output voltage and the battery reference voltage and generating the voltage difference control signal.

In one embodiment, when the battery voltage does not exceed the minimum output voltage, Vbr=a−b*Vbat, wherein Vbr is the battery reference voltage, Vbat is the battery voltage, a is a positive real number (unit in voltage) and b is a positive real number between 0 and 1; and when the battery voltage exceeds the minimum output voltage, Vbr=Vbat+ΔV, wherein ΔV is a predetermined minimum voltage difference.

The battery reference voltage determination circuit can be embodied in various ways. In one embodiment, the battery reference voltage determination circuit includes a voltage mapping table circuit receiving the battery voltage and generating the battery reference voltage according to the battery voltage.

In another embodiment, the battery reference voltage determination circuit includes a selection circuit, a first linear converter, and a second linear converter, wherein according to a level of the battery voltage, the selection circuit selectively couples the battery voltage as an input to the first linear converter to perform a first linear conversion, or to the second linear converter to perform a second linear conversion, to generate the battery reference voltage.

In another embodiment, the battery reference voltage determination circuit includes: a voltage divider receiving the battery voltage, and generating a first battery voltage divider signal and a second battery voltage divider signal according to the battery voltage; a first adder adding the first battery voltage divider signal and a first bias voltage, to generate its output; a second adder subtracting the second battery voltage divider signal from a second bias voltage, to generate its output; and a selection circuit selecting, according to a level of the battery voltage, one of the outputs from the first adder and the second adder, as the battery reference voltage.

The objectives, technical details, features, and effects of the present invention will be better understood with regard to the detailed description of the embodiments below, with reference to the drawings.

DESCRIPTION OF THE PREFERRED EMBODIMENTS

Figure 1:
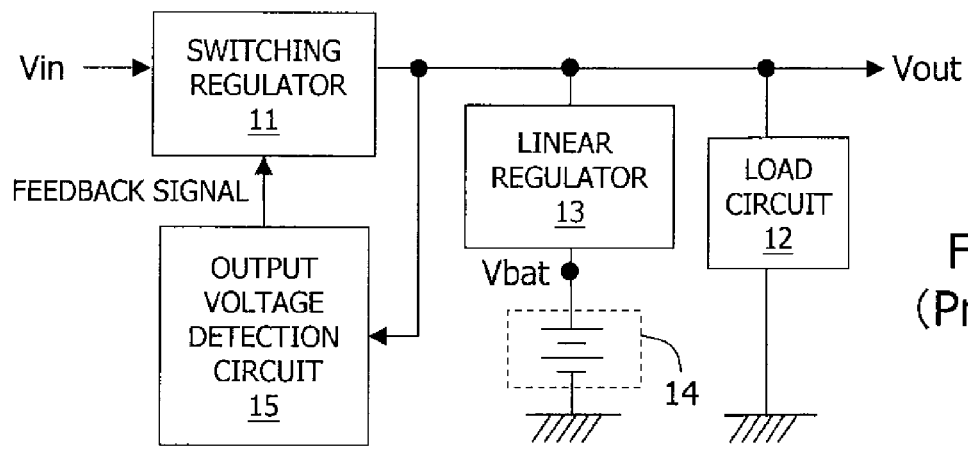
FIG. 1 shows a schematic circuit diagram of a prior art power management circuit with a battery.
Figure 2A:
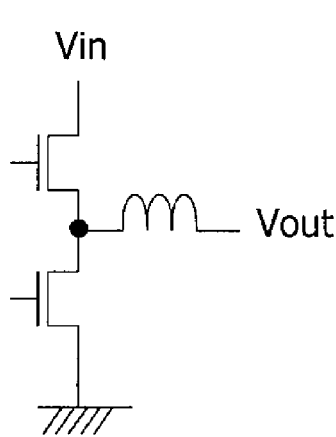
FIGS. 2A-2B show a synchronous buck converter and an asynchronous buck converter, respectively.
Figure 2B:
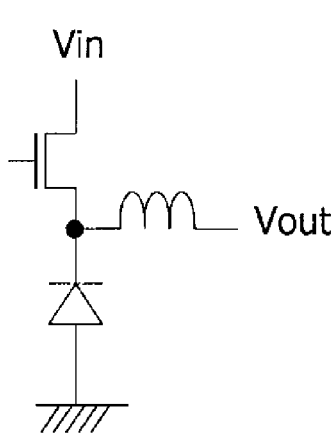
Figure 2C:
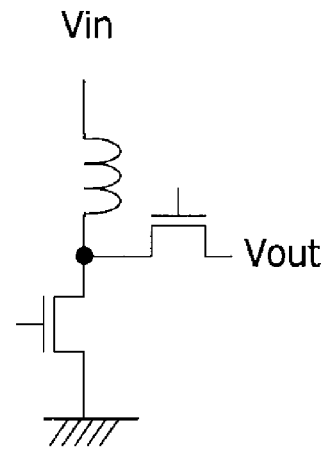
FIGS. 2C-2D show a synchronous boost converter and an asynchronous boost converter, respectively.
Figure 2D:
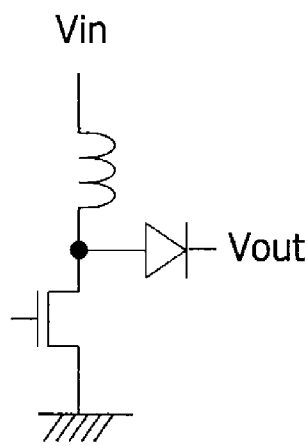
Figure 2E:
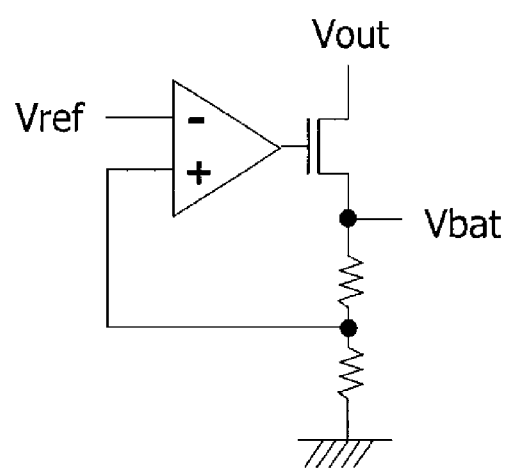
FIG. 2E shows a linear regulator.
Figure 3A:
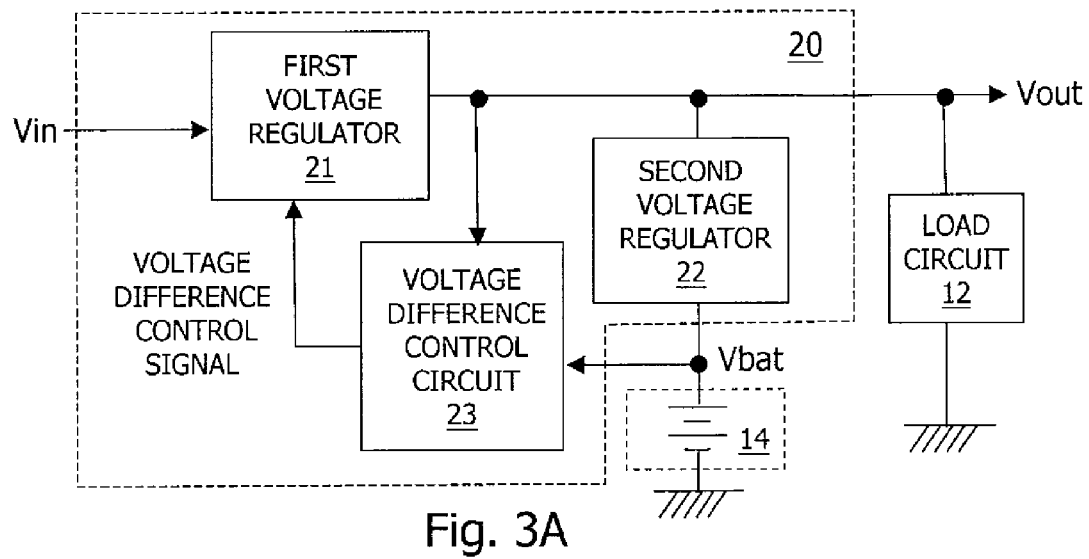
FIGS. 3A-3B show a first embodiment of the present invention.
Figure 3B:
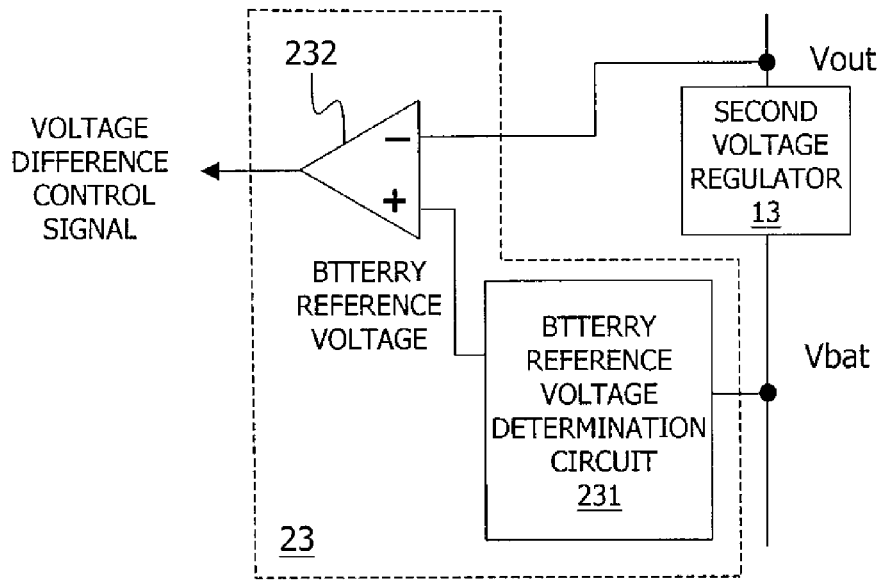

Please refer to FIGS. 3A-3B for a first embodiment of the present invention. As shown in FIG. 3A, a power management circuit 20 includes a first voltage regulator 21, a second voltage regulator 22 and a voltage difference control circuit 23, wherein the first voltage regulator 21 converts an input voltage Vin to an output voltage Vout according to a voltage difference control signal, and the output voltage Vout is supplied to a battery 14 and a load circuit 12. The first voltage regulator 21 may comprise, for example but not limited to, one of the buck switching regulators and boost switching regulators shown in FIGS. 2A-2D. The second voltage regulator 22 may comprise, for example but not limited to, one of the buck switching regulators, boost switching regulators, and linear regulator shown in FIGS. 2A-2E.

Figure 4:
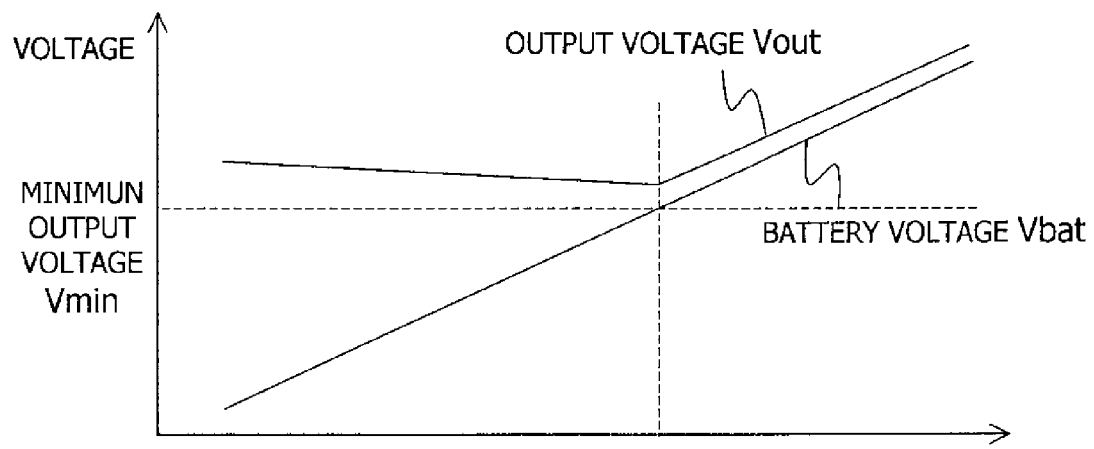
FIG. 4 shows, by way of example, a relationship that the present invention may achieve among the output voltage Vout, the minimum output voltage Vmin, and the battery voltage Vbat.

The voltage difference control circuit 23 receives the output voltage Vout and a battery voltage Vbat, and outputs the voltage difference control signal which is sent to the first voltage regulator 21 to control the output voltage Vout so that a relationship among the output voltage Vout, the minimum output voltage Vmin and the battery voltage Vbat is generated as shown in FIG. 4. In the relationship shown in FIG. 4, the output voltage Vout switches to different curves when the battery voltage Vbat is lower and higher than the minimum output voltage Vmin, respectively: (1) when the battery voltage Vbat exceeds the minimum output voltage Vmin, the output voltage is slightly higher than the battery voltage Vbat by a voltage difference (the voltage difference may be or may not be a constant, but it is preferably kept at a predetermined minimum to reduce power consumption in the second voltage regulator 22); (2) when the battery voltage Vbat does not exceed the minimum output voltage Vmin, the output voltage Vout is irrelevant to the battery voltage Vbat, and the output voltage Vout can be at any level slightly higher than the minimum output voltage Vmin. In case (2), the output voltage Vout is represented by a linear curve with a negative slope in FIG. 4, but this is only for example, and the output voltage Vout can be of any curve in any form as long as it is higher than the minimum output voltage Vmin.

Figure 5:
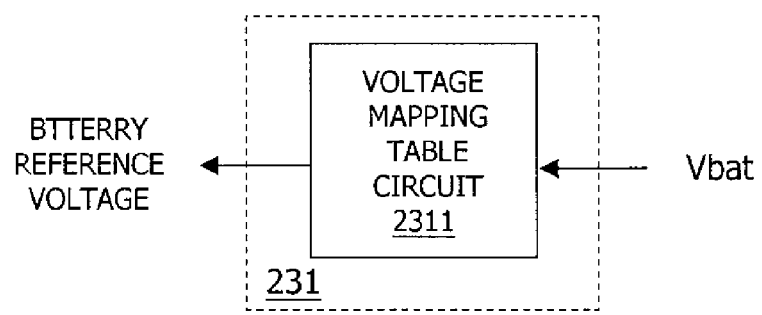
FIG. 5 shows a first embodiment of a battery reference voltage determination circuit 231.

Please refer to FIG. 3B for an embodiment of the voltage difference control circuit 23. The voltage difference control circuit 23 comprises a battery reference voltage determination circuit 231 and an error amplifier 232. The error amplifier 232 generates the voltage difference control signal according to the output voltage Vout and a battery reference voltage, and it provides the voltage difference control signal to the first voltage regulator 21. Due to loop feedback balance mechanism, when the whole circuitry is at a balanced state, the two inputs of the error amplifier 232 will be at the same voltage level, so the relationship in FIG. 4 can be achieved by properly controlling the battery reference voltage. The battery reference voltage is generated by the battery reference voltage determination circuit 231 according to the battery voltage Vbat. A first embodiment of the battery reference voltage determination circuit 231 is shown in FIG. 5, wherein the battery reference voltage determination circuit 231 includes a voltage mapping table circuit 2311 which determines the battery reference voltage according to the battery voltage Vbat. The relationship to map the battery voltage Vbat to the battery reference voltage for example may (1) when the battery voltage Vbat exceeds the minimum output voltage Vmin, Vbr=Vbat+ΔV, wherein Vbr is the battery reference voltage and ΔV is the aforementioned predetermined minimum voltage difference; when the battery voltage Vbat does not exceed the minimum output voltage Vmin, the battery reference voltage can be at any proper level higher than the minimum output voltage Vmin.

Figure 6:
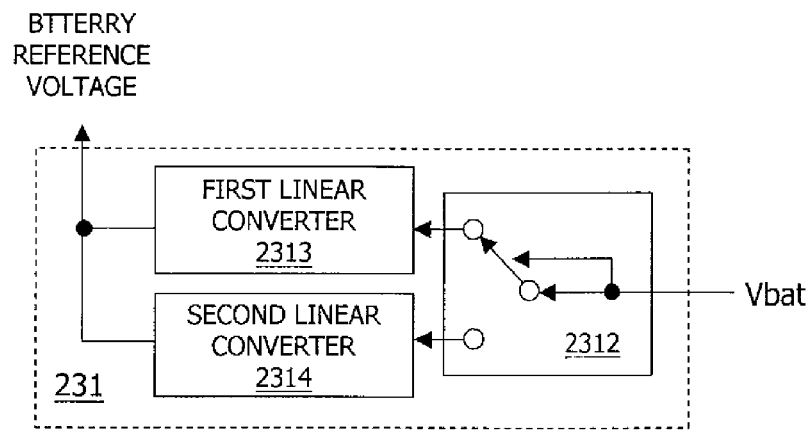
FIG. 6 shows a second embodiment of the battery reference voltage determination circuit 231.

FIG. 6 shows the second embodiment of the battery reference voltage determination circuit 231, wherein the battery reference voltage determination circuit 231 includes a selection circuit 2312, a first linear converter 2313, and a second linear converter 2314. According to a level of the battery voltage Vbat, the selection circuit 2312 selectively couples the battery voltage Vbat as an input to the first linear converter 2313 to perform a first linear conversion, or to the second linear converter 2314 to perform a second linear conversion, to generate the battery reference voltage. For example, when the battery voltage Vbat does not exceed the minimum output voltage Vmin, the selection circuit 2312 selectively couples the battery voltage Vbat as the input to the first linear converter 2313 to perform the first linear conversion so that a linear relationship between the battery reference voltage and the battery voltage Vbat would be, for example but not limited to:

$$Vbr = a - b * Vbat \quad \text{(equation 1)}$$

wherein Vbr is the battery reference voltage, Vbat is the battery voltage, a is a positive real number (unit in voltage) and b is a positive real number between 0 and 1.

And when the battery voltage Vbat exceeds the minimum output voltage Vmin, the selection circuit 2312 selectively couples the battery voltage Vbat as the input to the second linear converter 2314 to perform the second linear conversion so that the linear relationship between the battery reference voltage and the battery voltage Vbat would be, for example but not limited to:

$$Vbr = Vbat + \Delta V,$$

wherein ΔV is the predetermined minimum voltage difference.

The voltage difference control signal generated according to the battery reference voltage is inputted to the first voltage regulator 21 to control the output voltage Vout so that when the battery voltage Vbat exceed the minimum output voltage Vmin, the output voltage Vout is slightly higher than the battery voltage Vbat by the voltage difference ΔV; when the battery voltage Vbat does not exceed the minimum output voltage Vmin, the output voltage Vout is in a linear form with a negative slope as shown in FIG. 4. But certainly, the equation 1 is only an example and the output voltage Vout can be of any other form represented by any other equation as long as it is higher than the minimum output voltage Vmin.

Figure 7:
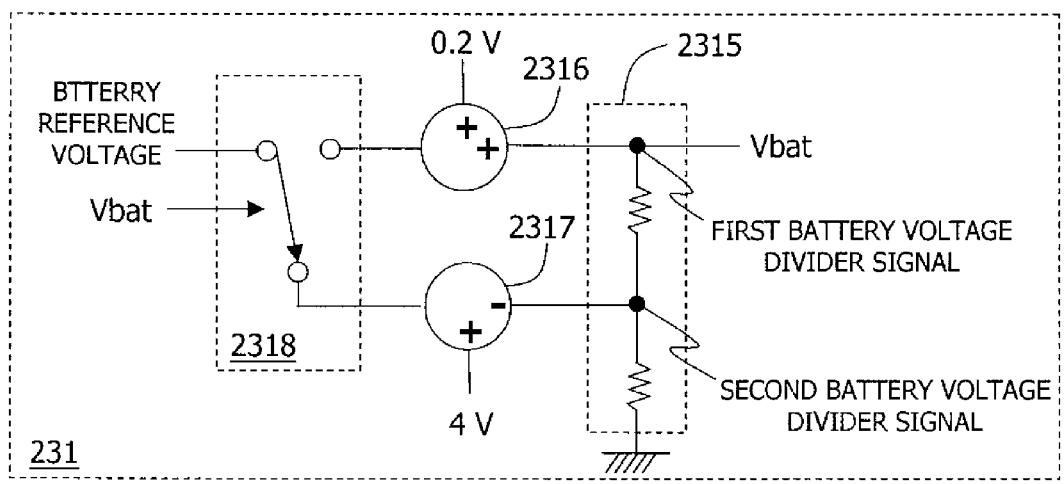
FIG. 7 shows a third embodiment of the battery reference voltage determination circuit 231.

FIG. 7 shows the third embodiment of the battery reference voltage determination circuit 231, which comprises a voltage divider 2315, a first adder 2316, a second adder 2317 and a selection circuit 2318. The voltage divider 2315 includes, for example but not limited to, two resistors connected in series between the output voltage Vout and ground. As shown in FIG. 7, the voltage divider 2315 divides the battery voltage Vbat to a first battery voltage divider signal and a second battery voltage divider signal, as inputs to the first adder 2316 and the second adder 2317, respectively, wherein the first battery voltage divider signal may be, for example but not limited to, the battery voltage Vbat, and the second battery voltage divider signal is a fractional number of the battery voltage Vbat, which may be, for example but not limited to, Vbat/3. The first adder 2316 adds the first battery voltage divider signal with a first bias voltage, for example but not limited to 0.2V, to generate an output which is sent to the selection circuit 2318. The second adder 2317 subtracts the second battery voltage divider signal (Vbat/3) from a second bias voltage, for example but not limited to 4V, to generate an output which is also sent to the selection circuit 2318.

The selection circuit 2318 selects one of the outputs from the first adder and the second adder as the battery reference voltage according to the level of the battery voltage Vbat. Similar to the equation 1, when the battery voltage Vbat does not exceed the minimum output voltage Vmin, this embodiment also provides a linear relationship between the battery reference voltage and the battery voltage Vbat, and the linear relationship is:

$$Vbr=a-b*Vbat,$$

wherein a is a positive real number with a unit of voltage (4V), and b is a positive real number (⅓) between 0 and 1; and when the battery voltage Vbat exceeds the minimum output voltage Vmin, $$Vbr=Vbat+\Delta V,$$

wherein ΔV is equal to 0.2. But certainly, the numbers mentioned above are for example only, and they can be modified as desired.

Figure 8:
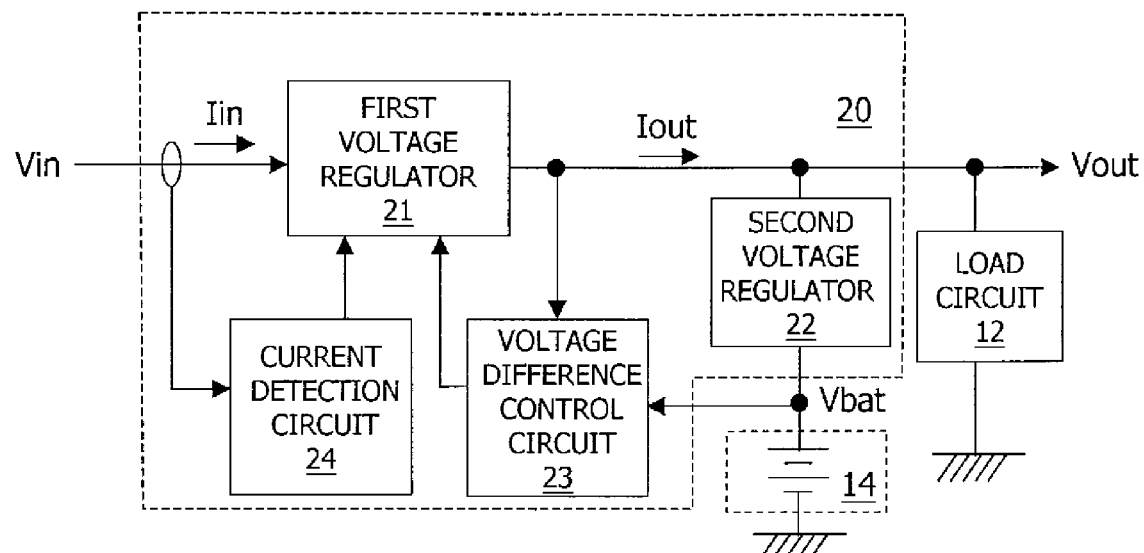
FIGS. 8-9 show a second embodiment of the present invention.
Figure 9:
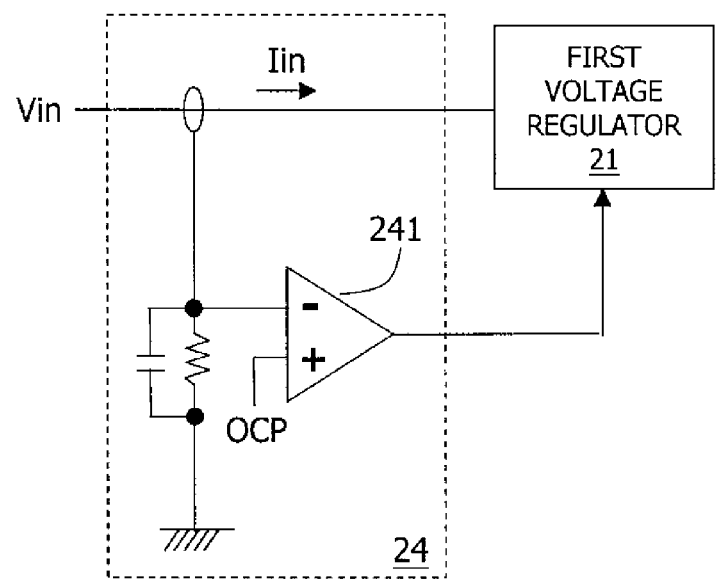

FIGS. 8-9 show the second embodiment of the present invention. In comparison with the first embodiment, the difference is that the power management circuit 20 of the second embodiment may further comprise a current detection circuit 22 for detecting an input current Iin of the first voltage regulator 21 to determine whether the input current Iin exceeds a predetermined normal operation limit. When the input current Iin exceeds the limit, the first voltage regulator 21 limits the amount of the input current Iin or pauses its operation to protect the circuit from being damaged by the current.

FIG. 9 shows an example to explain how the current detection circuit 22 detects and determines the input current Iin. The current detection circuit 22 can be embodied in various ways and what is shown is only one among many possible forms. As shown in the figure, the current detection circuit 22 detects the input current Iin and convert it to a voltage signal as one input to a comparator 221. The comparator 221 compares the voltage signal related to the input current Iin with a over current setting signal OCP, and the comparison result is inputted to the first voltage regulator 21 for over current protection.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device which does not affect the primary functions of the circuits can be interposed between two devices or circuits shown to be in direct connection in the illustrated embodiments. As yet another example, the positive input and negative input of the error amplifier (or comparator) can be interchanged with each other, with corresponding modifications in the circuit. Thus, the present invention should cover all such and other modifications and variations, which should be interpreted to fall within the scope of the following claims and their equivalents.

What is claimed is:

1. A power management circuit, comprising:
   a first voltage regulator converting an input voltage to an output voltage;
   a second voltage regulator coupled between the output voltage and a battery; and
   a voltage difference control circuit receiving the output voltage and a voltage (Vbat) of the battery, and outputting a voltage difference control signal to control the first voltage regulator so that when the battery voltage (Vbat) does not exceed a minimum output voltage, the output voltage is higher than the minimum output voltage, and when the battery voltage (Vbat) exceeds the minimum output voltage, the output voltage is higher than the battery voltage (Vbat) by a voltage difference;
   wherein the voltage difference control circuit includes:
      a battery reference voltage determination circuit generating a battery reference voltage (Vbr) related to the battery voltage (Vbat); and
      an error amplifier receiving the output voltage and the battery reference voltage and generating the voltage difference control signal.

2. The power management circuit of claim 1, wherein:
   when the battery voltage does not exceed the minimum output voltage, $$Vbr=a-b*Vbat,$$

wherein Vbr is the battery reference voltage, Vbat is the battery voltage, a is a positive real number (unit in voltage) and b is a positive real number between 0 and 1; and
   when the battery voltage exceeds the minimum output voltage, $$Vbr=Vbat+\Delta V,$$

wherein ΔV is a predetermined minimum voltage difference.

3. The power management circuit of claim 1, wherein the first voltage regulator is a buck switching regulator or a boost switching regulator.

4. The power management circuit of claim 1, wherein the second voltage regulator is a buck switching regulator, a boost switching regulator, or a linear regulator.

5. The power management circuit of claim 1, wherein the battery reference voltage determination circuit includes a voltage mapping table circuit receiving the battery voltage and generating the battery reference voltage according to the battery voltage.

6. The power management circuit of claim 1, wherein the battery reference voltage determination circuit includes a selection circuit, a first linear converter, and a second linear converter, wherein according to a level of the battery voltage, the selection circuit selectively couples the battery voltage as an input to the first linear converter to perform a first linear conversion, or to the second linear converter to perform a second linear conversion, to generate the battery reference voltage.

7. The power management circuit of claim 1, wherein the battery reference voltage determination circuit includes:
   a voltage divider receiving the battery voltage, and generating a first battery voltage divider signal and a second battery voltage divider signal according to the battery voltage;
   a first adder adding the first battery voltage divider signal and a first bias voltage, to generate its output;
   a second adder subtracting the second battery voltage divider signal from a second bias voltage, to generate its output; and
   a selection circuit selecting, according to a level of the battery voltage, one of the outputs from the first adder and the second adder, as the battery reference voltage.

8. The power management circuit of claim 1, further comprising a current detection circuit detecting an input current of the first voltage regulator to determine whether the input current exceeds a predetermined normal operation limit.

* * * * *